United States Patent
Amano (10) Patent No.: US 10,609,476 B2
(45) Date of Patent: Mar. 31, 2020

(54) DISPLAY APPARATUS AND COMMUNICATION TERMINAL

(71) Applicant: Masato Amano, Kanagawa (JP)

(72) Inventor: Masato Amano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/297,891

(22) Filed: Mar. 11, 2019

(65) Prior Publication Data

US 2019/0289390 A1   Sep. 19, 2019

(30) Foreign Application Priority Data

Mar. 16, 2018 (JP) ................................. 2018-049606

(51) Int. Cl.
  *H04R 1/40* (2006.01)
  *H04R 1/02* (2006.01)
  *H04N 7/14* (2006.01)
  *H04N 7/15* (2006.01)

(52) U.S. Cl.
  CPC ............. *H04R 1/406* (2013.01); *H04R 1/028* (2013.01); *H04N 7/142* (2013.01); *H04N 7/15* (2013.01); *H04R 2201/401* (2013.01); *H04R 2499/15* (2013.01)

(58) Field of Classification Search
  CPC .. H04R 1/406; H04R 1/028; H04R 2201/401; H04R 2499/15; H04N 7/15; H04N 7/142
  See application file for complete search history.

(56) References Cited

U.S. PATENT DOCUMENTS

| | | | | |
|---|---|---|---|---|
| 8,712,393 B2* | 4/2014 | Kim | ...................... | G06F 1/1626 455/418 |
| 2008/0146289 A1* | 6/2008 | Korneluk | ............ | H04M 1/6041 455/569.1 |
| 2011/0044478 A1* | 2/2011 | Qu | ........................ | H04M 1/605 381/123 |
| 2014/0221048 A1* | 8/2014 | Kumor | ................ | H04M 1/6008 455/566 |

FOREIGN PATENT DOCUMENTS

| | | |
|---|---|---|
| JP | 4-181898 | 6/1992 |
| JP | 4-278797 | 10/1992 |
| JP | 2002-091469 | 3/2002 |
| JP | 2014-068099 | 4/2014 |
| JP | 2014-110613 | 6/2014 |
| JP | 2017-129873 | 7/2017 |
| JP | 2017-168977 | 9/2017 |

* cited by examiner

*Primary Examiner* — Andrew L Sniezek (74) *Attorney, Agent, or Firm* — Harness, Dickey & Pierce, P.L.C.

(57) ABSTRACT

A display apparatus includes a display surface, a plurality of microphones, each being arranged on each of peripheral sides of the display surface, and an orientation detecting sensor configured to detect orientation of the display surface. Each of the plurality of microphones is arranged so as not to be aligned with respect to other microphones arrayed on other sides in a first direction along one side of the display surface and a second direction orthogonal to the first direction. The display apparatus further includes circuitry configured to set an order of arrangement of the plurality of microphones in a horizontal direction based on a result obtained by the orientation detecting sensor.

20 Claims, 5 Drawing Sheets

COMPARATIVE PRODUCT

FIG. 5

COMPARATIVE PRODUCT

DISPLAY APPARATUS AND COMMUNICATION TERMINAL

CROSS-REFERENCE TO RELATED APPLICATION

This patent application is based on and claims priority pursuant to 35 U.S.C. § 119(a) to Japanese Patent Application No. 2018-049606, filed on Mar. 16, 2018, in the Japan Patent Office, the entire disclosure of which is hereby incorporated by reference herein.

BACKGROUND

Technical Field

The present disclosure relates to a display apparatus and a communication terminal.

Description of the Related Art

Remote conference systems are now in widespread use, that connect communication terminals provided at different locations (sites) with each other via a network such as the Internet, thereby enabling users to perform a teleconference.

The communication terminal in such conference system is provided in a conference room, or the like, at each of sites. Images and sounds of conference attendees are exchanged between the communication terminals of an own and the other party to proceed the teleconference.

Further a technique is known that uses a microphone array including a plurality of microphones arranged in a horizontal direction as microphones for inputting sounds in the communication terminal. With the use of such microphone array, a direction of a speaker can be identified from among persons scattered around on a floor that is parallel in the horizontal direction. Sounds coming from the other directions than the speaker direction are removed as noise.

SUMMARY

According to an embodiment of the present disclosure, a display apparatus includes a display surface, a plurality of microphones, each being arranged on each of peripheral sides of the display surface, and an orientation detecting sensor configured to detect orientation of the display surface. Each of the plurality of microphones is arranged so as not to be aligned with respect to other microphones arrayed on other sides in a first direction along one side of the display surface and a second direction orthogonal to the first direction. The display apparatus further includes circuitry configured to set an order of arrangement of the plurality of microphones in a horizontal direction based on a result obtained by the orientation detecting sensor.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

According to the conventional technique, when an installation angle of the product incorporating the microphone array is rotated by 90 degrees (changed from landscape orientation to portrait orientation), the microphones come into alignment in the vertical direction, making it difficult to specify the direction of the speaker.

To address this issue, it is conceivable, in the case of a communication terminal such as a tablet terminal to be used in portrait orientation and landscape orientation, to incorporate two rows of microphone arrays. Specifically, a first microphone array that arranges a plurality of microphones in the horizontal direction when disposed in portrait orientation and a second microphone array that arranges a plurality of microphones in the horizontal direction when disposed in landscape orientation are incorporated in the product. In this case, however, the number of microphones doubles.

Embodiments of a tablet terminal 1, which is an example of a communication terminal incorporating a display apparatus of the present disclosure will be described below with reference to FIGS. 1 to 3.

Figure 1:
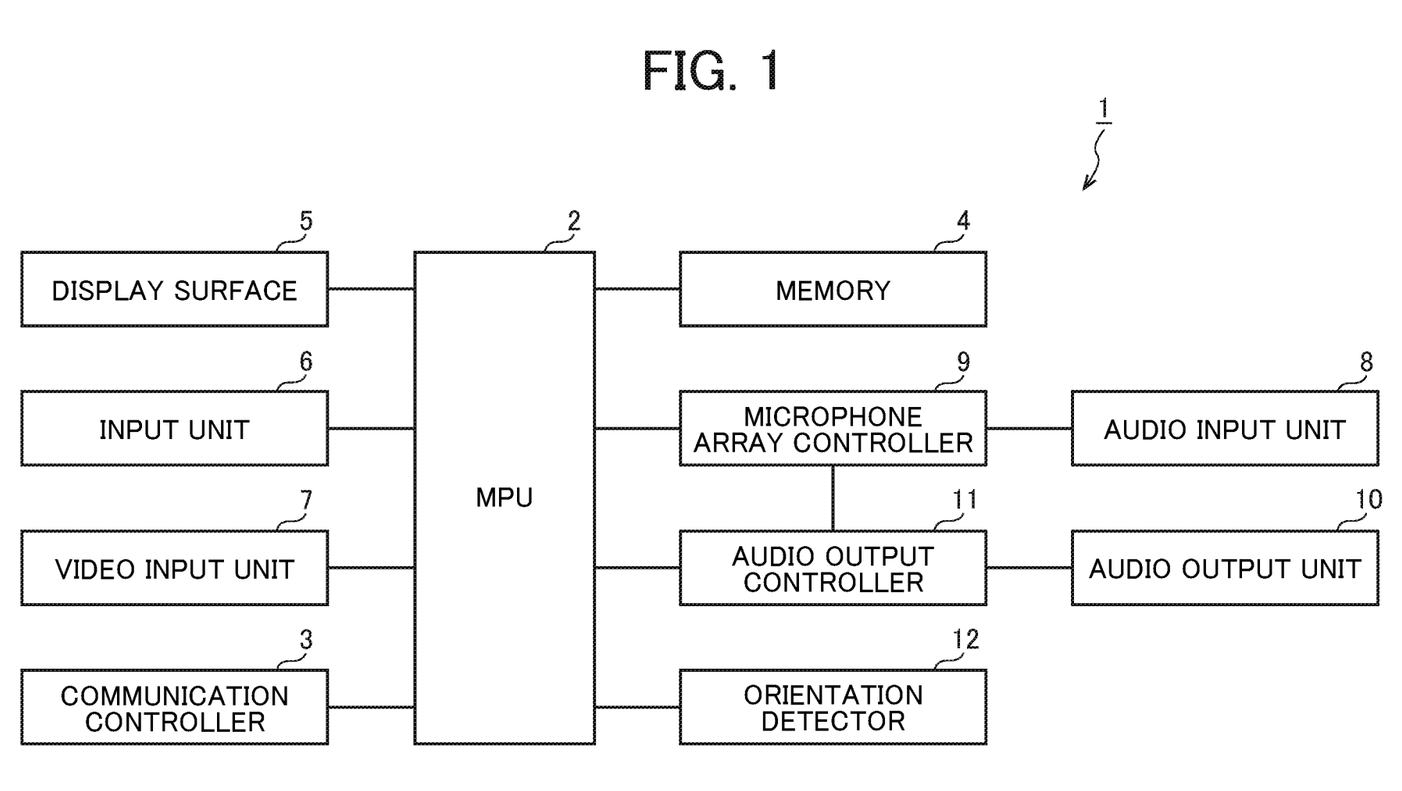
FIG. 1 is a block diagram illustrating a tablet terminal as a communication terminal including a display apparatus, according to an embodiment of the present disclosure.

As illustrated in FIG. 1, the tablet terminal 1 (communication terminal) includes a micro processing unit (MPU) 2, a communication controller 3 (communication unit), a memory 4, a display surface 5, an input unit 6, a video input unit 7, an audio input unit 8, a microphone array controller 9, an audio output unit 10, an audio output controller 11, and an orientation detector 12.

The MPU 2 controls entire operation of the tablet terminal 1.

The communication controller 3 (communication unit), which is implemented by, for example, a network card operating in accordance with instructions of the MPU 2, communicates with another tablet terminal by using a communication system such as a local area network (LAN) or wireless communication. For example, the other tablet terminal is provided in a conference room at a remote location. The communication controller 3 receives a video or sound of a speaker from the other tablet terminal. The communication controller 3 transmits the video or sound of the speaker input from the video input unit 7 and the audio input unit 8 described below to the other tablet terminal.

The memory 4 stores a control program to be executed by the MPU 2, or the like.

Figure 2:
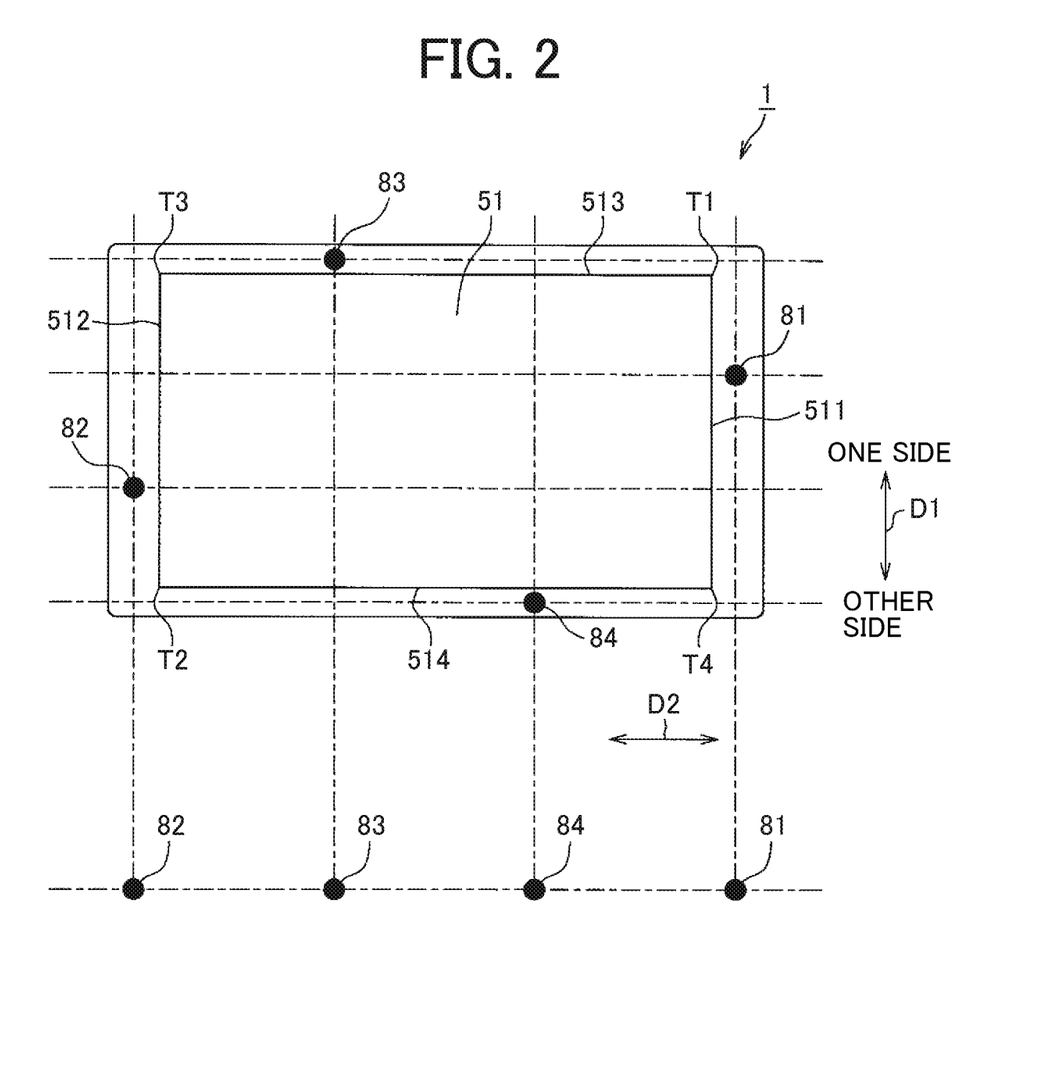
FIG. 2 is an external view of the tablet terminal illustrated in FIG. 1 in landscape orientation.
Figure 3:
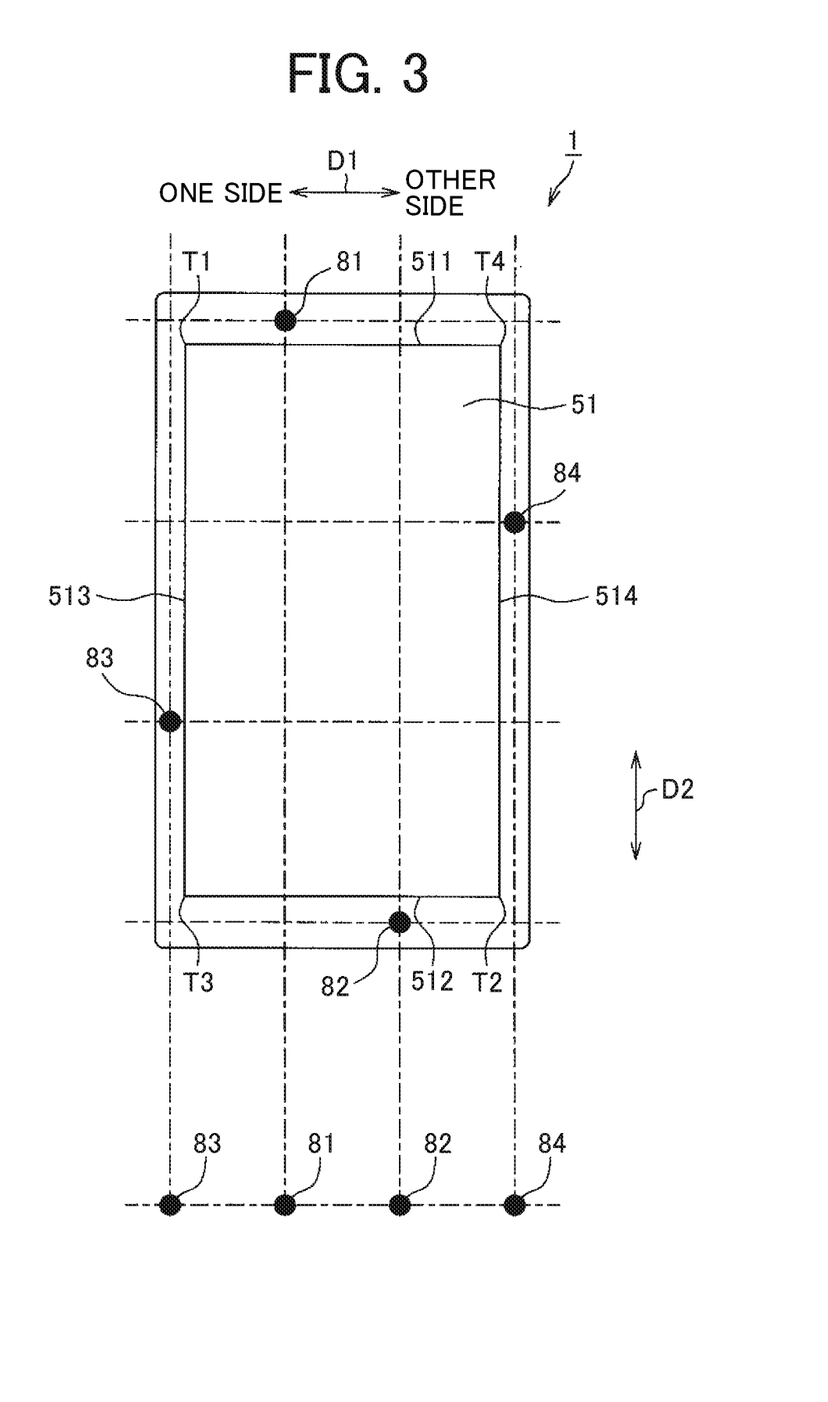
FIG. 3 is an external view of the tablet terminal illustrated in FIG. 1 in portrait orientation.

The display surface 5 is implemented by a liquid crystal display, for example, and includes a rectangular display surface 51 as illustrated in FIGS. 2 and 3. The display surface 5 displays video of a speaker, or the like, received through the communication controller 3.

The input unit 6 is implemented by input devices such as a touch sensor and a keyboard, allowing a user to operate the tablet terminal 1.

The video input unit 7 is implemented by a camera or the like, and photographs a speaker in a conference room where the tablet terminal 1 is provided.

The audio input unit 8 is formed with a microphone array including a plurality of microphones 81 to 84 (refer to FIGS. 2 and 3) for obtaining audio of the speaker during the conference. The arrangement of the plurality of microphones 81 to 84 will be described below.

The microphone array controller 9, which is implemented by, for example, a hardware unit operating in accordance with a program of the MPU 2, performs beamforming on the sound of the speaker input from the plurality of microphones 81 to 84 to detect the direction of the speaker. The microphone array controller 9 uses post-filter processing to remove sounds input from the direction other than the speaker's direction, as noise.

The audio output unit 10 is implemented by a speaker, a headphone, or the like, so as to output sound.

The audio output controller 11 controls the audio output unit 10 in accordance with the control of the MPU 2. The audio output controller 11 controls the audio output unit 10 to output the sound of the speaker with its noise having been removed by the microphone array controller 9. The audio output controller 11 controls the audio output unit 10 to output the sound of the speaker received from another tablet terminal through the communication controller 3.

The orientation detector 12 is implemented by an acceleration sensor or the like to detect the orientation of the tablet terminal 1. The MPU 2 functions as a setting unit (circuitry) to set the arrangement of the microphones 81 to 84 on the basis of orientation data obtained as the detection result of the orientation detector 12, and output the setting result to the microphone array controller 9.

The microphone array controller 9 performs beamforming processing corresponding to the arrangement of the microphones 81 to 84 set by the MPU 2, so as to detect the direction of the speaker.

Next, arrangement of the microphones 81 to 84 will be described with reference to FIGS. 2 and 3. The display surface 51 has a rectangular shape, having a pair of short sides 511 and 512 (a first side and a second side) and a pair of long sides 513 and 514 (a third side and a fourth side). Each of the microphones 81 to 84 are arranged on each of sides 511 to 514 at the periphery of the display surface 51, one for each. The microphones 81 to 84 are arranged without being aligned with the others of the microphones 81 to 84 arranged on the other sides, in any of a short side direction D1 (first direction) or a long side direction D2 (second direction). In other words, any one of the microphones 81 to 84 overlap with the other ones of the microphones 81 to 84 arranged on the other sides in the short side direction D1 or in the long side direction D2. The short side direction D1 and the long side direction D2 are orthogonal to each other.

More detailed description will be given below. The microphone 81 is disposed at a portion on the short side 511, which is one of the pair of short sides 511 and 512. The microphone 81 is disposed at a position closer to an end portion T1 on one side with respect to the center in the short side direction D1. In the present embodiment, the microphone 81 is disposed at a position about ⅓ of the length of the short side 511 from the end portion T1.

The microphone 82 is disposed at a portion on the short side 512, which is the other one of the pair of short sides 511 and 512. The microphone 82 is disposed at a position closer to an end portion T2 on the other side with respect to the center in the short side direction D1. In the present embodiment, the microphone 82 is disposed at a position about ⅓ of the length of the short side 512 from the end portion T2.

The microphone 83 is arranged at a portion on the long side 513, which is one of the pair of long sides 513 and 514, the long side 513 being on the one side in the short side direction D1. The microphone 83 is disposed at a position closer an end portion T3, which is on the short side 512 with respect to the center in the long side direction D2. In the present embodiment, the microphone 83 is disposed at a position about ⅓ of the length of the long side 513 from the end portion T3.

The microphone 84 is arranged at a portion on the long side 514, which is the other one of the pair of long sides 513 and 514, the long side 514 being on the other side in the short side direction D1. The microphone 84 is disposed at a position closer to an end portion T4, which is on the short side 511 with respect to the center in the long side direction D2. In the present embodiment, the microphone 84 is disposed at a position about ⅓ of the length of the long side 514 from the end portion T4.

With this configuration, the microphone 81 is arranged without being aligned with any of the microphones 82 to 84 arranged on the other sides in the short side direction D1 or the long side direction D2. The microphone 82 is arranged without being aligned with any of the microphones 81, 83, or 84 arranged on the other sides in the short side direction D1 or the long side direction D2. The microphone 83 is arranged without being aligned with any of the microphones 81, 82, or 84 arranged on the other sides in the short side direction D1 or the long side direction D2. The microphone 84 is arranged without being aligned with any of the microphones 81 to 83 arranged on the other sides in the short side direction D1 or the long side direction D2.

This arrangement enables to locate the microphones 81 to 84 apart from each other in the horizontal direction (long side direction D2) when disposed in landscape orientation as illustrated in FIG. 2. It is also possible to locate the microphones 81 to 84 apart from each other in the horizontal direction (short side direction D1) when disposed in portrait orientation as illustrated in FIG. 3. Accordingly, it is possible to detect the direction of the speaker regardless of whether the tablet terminal 1 is disposed in portrait orientation or landscape orientation.

Furthermore, according to the above-described embodiment, the microphones 81 to 84 are disposed near the end portions T1 to T4, respectively. With this configuration, regardless of whether the tablet terminal 1 is disposed in portrait orientation or landscape orientation, it is possible to arrange the microphones 81 to 84 at intervals of equal to or longer than a predetermined distance (minimum inter-microphone distance sufficiently achieving microphone array performance) in the horizontal direction.

Moreover, the microphone 81 is disposed at a position about ⅓ of the length of the short side 511 from the end portion T1; the microphone 82 is arranged at a position about ⅓ of the length of the short side 512 from the end portion T2; the microphone 83 is disposed at a position about ⅓ of the length of the long side 513 from the end portion T3; and the microphone 84 is arranged at a position about ⅓ of the length of the long side 514 from the end portion T4.

With this configuration, it is possible to arrange the microphones 81 to 84 in the horizontal direction, as illustrated in FIG. 2, at intervals of ⅓ of the length of the long sides 513 and 514, when disposed in landscape orientation. Furthermore, it is possible to arrange the microphones 81 to 84 in the horizontal direction, as illustrated in FIG. 3, at intervals of ⅓ of the length of the short sides 511 and 512, when disposed in portrait orientation.

Meanwhile, in order to achieve functions of the microphone array properly, the microphone array controller 9 needs to recognize the arrangement order of the microphones 81 to 84. In the present disclosure, as can be seen from FIGS. 2 and 3, the arrangement order of the microphones 81 to 84 is changed by the rotation of the tablet terminal 1, and thus, the microphone array controller 9 needs to detect the arrangement order of the microphones 81 to 84 whenever necessary.

To achieve this, the arrangement order of the four microphones 81 to 84 in the horizontal direction with respect to orientation data by the orientation detector 12 is stored in advance in the memory 4 as an information table. The MPU 2 recognizes that the tablet terminal 1 is rotated when the orientation data from the orientation detector 12 changes by greater than a certain angle. The MPU 2 next informs the microphone array controller 9 of the arrangement order of the four microphones 81 to 84 in accordance with the information table containing the microphone arrangement order corresponding to the orientation data read from the memory 4.

The microphone array controller 9 switches beamforming processing in accordance with the information regarding the microphone arrangement order transmitted from the MPU 2 and detect the direction of the speaker according to appropriate microphone arrangement order information. Table 1 below is an example of the information table associating the microphone arrangement orders with the orientation data of the tablet terminal 1 stored in the memory 4.

TABLE 1

| Orientation data γ | Arrangement order<br>*Defined as the<br>order from the left to the right |
|---|---|
| $-10° \leq \gamma \leq 10°$ | 82 -> 83 -> 84 -> 81 |
| $80° \leq \gamma \leq 100°$ | 83 -> 81 -> 82 -> 84 |
| $170° \leq \gamma \leq 190°$ | 81 -> 84 -> 83 -> 82 |
| $260° \leq \gamma \leq 280°$ | 84 -> 82 -> 81 -> 83 |
| Angles other than those described above | No microphone<br>(No support for microphone array) |

The above Table 1 defines that the orientation data γ is equal to 0° when the tablet terminal 1 is in landscape orientation as illustrated in FIG. 2. The arrangement order is defined as the order from the left to the right as viewed from the front of the tablet terminal 1 in FIGS. 2 and 3. In this manner, preliminarily storing the information table related to the arrangement order in the memory 4 enables the MPU 2 to easily set the arrangement order.

Next, effects of the above-described embodiment will be described in comparison with comparative products illustrated in FIGS. 4 and 5. As illustrated in the figures, a tablet terminal 100 as a comparative product has four microphones 801 to 804 arranged along the long side of the display surface, and four microphones 804 to 807 arranged along the short side of the display surface. The microphone 804 is disposed at a junction of the short side and the long side, resulting in an arrangement of seven microphones 801 to 807 in the comparative product.

Figure 4:
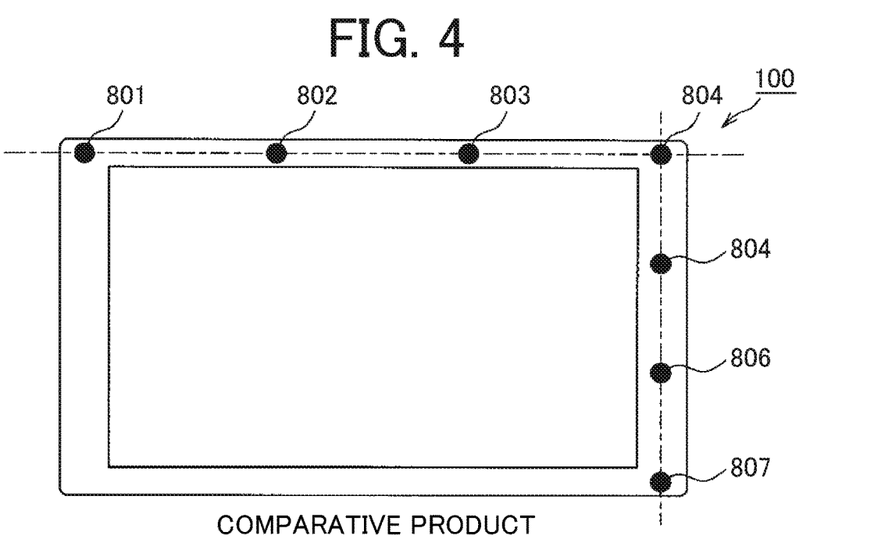
FIG. 4 is an external view of a tablet terminal of a comparative product in landscape orientation.

FIG. 4 illustrates a case where the tablet terminal 100 as a comparative product is disposed in landscape orientation. In this state, a microphone array configuration using four the microphones 801 to 804 is the microphone configuration enabling the microphone array to operate effectively. In this example, the microphone arrays are aligned along the horizontal axis. Since the floor surface is also along the same horizontal axis, it is possible to detect the direction in which the speaker is present from among the people gathered in front of the tablet terminal 100.

Figure 5:
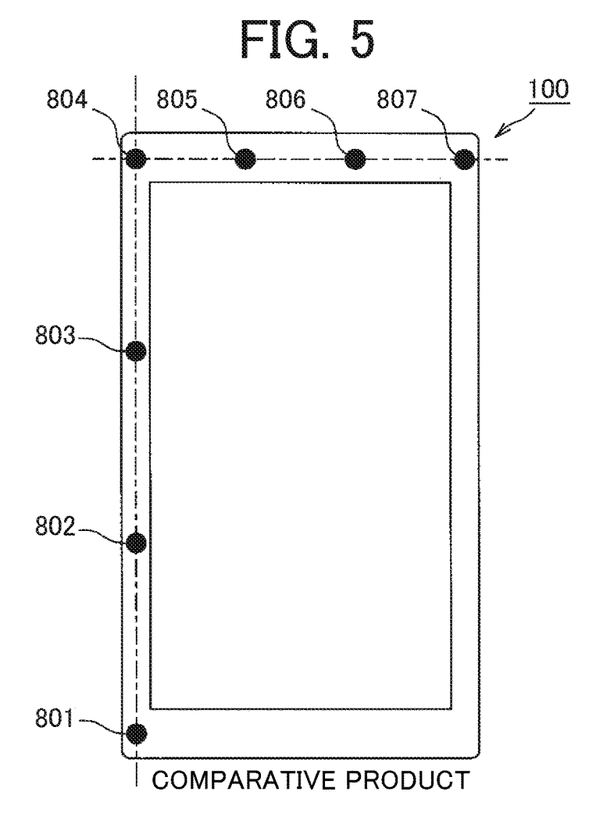
FIG. 5 is an external view of a tablet of a comparative product in portrait orientation.

However, when the tablet terminal 100 is rotated by 90° and disposed in portrait orientation as illustrated in FIG. 5 (installation angle at which the display screen becomes vertically long), the microphone array configuration (microphones 801 to 804) that is effective in FIG. 4 becomes aligned along the vertical axis, orthogonal to the horizontal axis of the floor surface, making it difficult to function effectively as a microphone array (meaning that it is difficult to detect the speaker's direction).

To address this issue, a second microphone array (microphones 804 to 807) is arranged on the vertical axis in the tablet terminal 100 of FIG. 4 and FIG. 5. This second microphone array does not function when the tablet terminal 100 is disposed in landscape orientation as illustrated in FIG. 4. However, when the tablet terminal 100 is rotated by 90° and disposed in portrait orientation as illustrated in FIG. 5, the axis of the second microphone array shifts from the vertical axis to the horizontal axis. This enables the second microphone array to function in place of the first microphone array, which does not function in portrait orientation.

In this manner, providing the first microphone array and the second microphone array causes the microphone array to function effectively even when the installation angle of the tablet terminal 100 is rotated. This comparative product, however, needs seven microphones 801 to 807 to cause the four microphones to function regardless of whether the tablet terminal 100 is disposed in portrait orientation or landscape orientation. By contrast, in the present embodiment, since the four microphones 81 to 84 can function regardless of whether the tablet terminal 1 is disposed in portrait orientation or landscape orientation as described above, there is no need to provide more than four microphones.

The present embodiment provides a technology enabling the microphone array to cope with the rotation of the tablet terminal 1 installation angle simply with the first microphone array (microphones 81 to 84) without adding another microphone array, as opposed to the comparative product enabling the microphone array to cope with the rotation of the tablet terminal 100 installation angle by adding the second microphone array described above to the tablet terminal 100. That is, the tablet terminal 1 of the present embodiment can detect the direction of the speaker corresponding to the installation angle rotation while reducing the number of microphones.

According to the above-described embodiment, each of the microphone 81 to 84 is provided for each of the sides 511 to 514 one for each. The present disclosure, however, is not limited to this arrangement. For example, a plurality of microphones may be arranged on each of the sides. That is, it is sufficient as long as the microphones arranged on different sides are arranged without being aligned in any of the short side direction D1 or the long side direction D2. The microphones arranged on the same side may be aligned in the short side direction D1 or in the long side direction D2.

Figure 6:
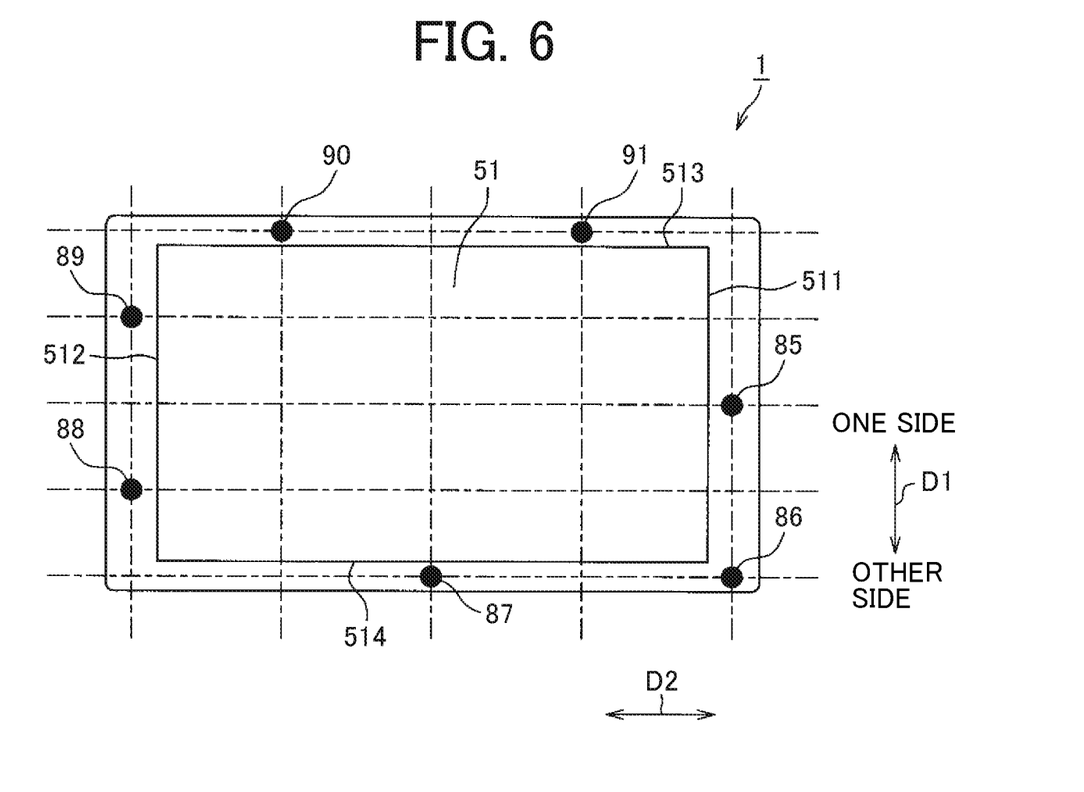
FIG. 6 is an external view of a tablet terminal in landscape orientation, according to another embodiment of the present disclosure.

FIG. 6 illustrates an example in which seven microphones 85 to 91 are arranged on the sides, two microphones on each of the sides. In the example illustrated in FIG. 6, it is possible to allow the five microphones 85 to 91 to operate effectively regardless of whether the tablet terminal 1 is disposed in portrait orientation or landscape orientation. The comparative product as illustrated in FIGS. 4 and 5 requires nine microphones to be disposed in order to allow five microphones to function effectively. In contrast, in the example illustrated in FIG. 6, providing seven microphones 85 to 91 is enough to and therefore the number of microphones is reduced.

As described above, according to one or more embodiments of the present disclosure, it is possible to detect the direction of the speaker corresponding to the installation angle rotation while reducing the number of microphones.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A display apparatus comprising:
   a display surface;
   a plurality of microphones, each being arranged on each of peripheral sides of the display surface;
   an orientation detecting sensor configured to detect orientation of the display surface, wherein each of the plurality of microphones is arranged so as not to be aligned with respect to other microphones arrayed on other sides in a first direction along one side of the display surface and a second direction orthogonal to the first direction; and
   circuitry configured to,
      set an order of arrangement of at least two microphones of the plurality of microphones in a horizontal direction based on a result obtained by the orientation detecting sensor, and
      identify a horizontal sound input direction of a speaking individual based on sound input from the at least two microphones and the order of arrangement of the at least two microphones in the horizontal direction.

2. The display apparatus according to claim 1, wherein each of the plurality of microphones is disposed on each of the peripheral sides of the display surface, one for each of sides.

3. The display apparatus according to claim 2, wherein the display surface has a first side and a second side, each being along the first direction, and a third side and a fourth side, each being along the second direction,
   one of the plurality of the microphones is disposed at a first position in the first side, the first position being close to one end portion on one side in the first direction,
   another one of the plurality of microphones disposed at a second position in the second side, the second position being close to the other end portion on the other side in the first direction,
   still another one of the plurality of microphones is disposed at a third position in the third side, the third side being a side on the one side in the first direction, the third position being close to one end portion on one side in the second direction, and
   still another one of the plurality of microphones is disposed at a fourth position in the fourth side, the fourth side being a side on the other side in the first direction, the fourth position being close to the other end portion on the other side in the second direction.

4. The display apparatus according to claim 1, further comprising:
   a memory configured to store the order of arrangement of the at least two microphones in the horizontal direction corresponding to the orientation of the display surface,
   wherein the circuitry is further configured to read, from the memory, the order corresponding to a detection result obtained by the orientation detecting sensor and performs setting for the order.

5. A communication terminal comprising:
   the display apparatus according to claim 1; and
   a communication controller configured to transmit sound input into the plurality of microphones, to another device.

6. The display apparatus of claim 1, further comprising:
   a memory configured to store, for an orientation angle range of the orientation of the display surface, an order of arrangement of the at least two microphones in the horizontal direction when the result obtained by the orientation detecting sensor is within the orientation angle range.

7. The display apparatus of claim 1,
   wherein the plurality of microphones includes,
      a first microphone array of at least two microphones that are arranged along a first peripheral side of the display surface that is in a horizontal orientation while the display surface is in a portrait orientation, and
      a second microphone array of at least two microphones that are arranged along a second peripheral side of the display surface that is in a horizontal orientation while the display surface is in a landscape orientation, and
   wherein the circuitry is further configured to set the order of arrangement of the at least two microphones by,
      setting the order of arrangement of the first array of at least two microphones while the orientation detected by the orientation detecting sensor indicates that the display surface is in the portrait orientation, and
      setting the order of arrangement of the second array of at least two microphones while the orientation detected by the orientation detecting sensor indicates that the display surface is in the landscape orientation.

8. The display apparatus of claim 7, wherein the circuitry is further configured to,
refrain from using the second microphone array of at least two microphones while the display surface is in the portrait orientation, and
refrain from using the first microphone array of at least two microphones while the display surface is in the landscape orientation.

9. The display apparatus of claim 1, wherein the circuitry is configured to identify the horizontal sound input direction of the speaking individual by performing beamforming on a sound of a speaker input from the plurality of microphones.

10. The display apparatus of claim 1, wherein the circuitry is further configured to use post-filter processing to remove, from audio obtained by the plurality of microphones, sound input from a direction other than the horizontal sound input direction of the speaking individual.

11. The display apparatus of claim 10, further comprising:
an audio output unit, and
an audio output controller that is configured to control the audio output unit to output the audio obtained by the plurality of microphones after the post-filter processing.

12. A microphone array controller, comprising:
circuitry configured to:
receive, from an orientation detecting sensor, an orientation of a display surface of a display including a plurality of microphones, wherein each of the plurality of microphones is arranged so as not to be aligned with respect to other microphones arrayed on other sides in a first direction along one side of the display surface and a second direction orthogonal to the first direction,
set an order of arrangement of at least two microphones of a plurality of microphones in a horizontal direction based on a result obtained by the orientation detecting sensor, and
identify a horizontal sound input direction of a speaking individual based on sound input from the at least two microphones and the order of arrangement of the at least two microphones in the horizontal direction.

13. The microphone array controller according to claim 12, further comprising:
a memory configured to store the order of arrangement of the at least two microphones in the horizontal direction corresponding to the orientation of the display surface,
wherein the circuitry is further configured to read, from the memory, the order corresponding to a detection result obtained by the orientation detecting sensor and performs setting for the order.

14. The microphone array controller of claim 13, wherein the memory is further configured to store, for an orientation angle range of the orientation of the display surface, an order of arrangement of the at least two microphones in the horizontal direction when the result obtained by the orientation detecting sensor is within the orientation angle range.

15. The microphone array controller of claim 12,
wherein the plurality of microphones includes,
a first microphone array of at least two microphones that are arranged along a first peripheral side of the display surface that is in a horizontal orientation while the display surface is in a portrait orientation, and
a second microphone array of at least two microphones that are arranged along a second peripheral side of the display surface that is in a horizontal orientation while the display surface is in a landscape orientation, and
wherein the circuitry is further configured to set the order of arrangement of the at least two microphones by,
setting the order of arrangement of the first array of at least two microphones while the orientation detected by the orientation detecting sensor indicates that the display surface is in the portrait orientation, and
setting the order of arrangement of the second array of at least two microphones while the orientation detected by the orientation detecting sensor indicates that the display surface is in the landscape orientation.

16. The microphone array controller of claim 15, wherein the circuitry is further configured to,
refrain from using the second microphone array of at least two microphones while the display surface is in the portrait orientation, and
refrain from using the first microphone array of at least two microphones while the display surface is in the landscape orientation.

17. The microphone array controller of claim 12, wherein the circuitry is configured to identify the horizontal sound input direction of the speaking individual by performing beamforming on a sound of a speaker input from the plurality of microphones.

18. The microphone array controller of claim 12, wherein the circuitry is further configured to use post-filter processing to remove, from audio obtained by the plurality of microphones, sound input from a direction other than the horizontal sound input direction of the speaking individual.

19. The microphone array controller of claim 18, further comprising:
an audio output controller that is configured to control an audio output unit to output the audio obtained by the plurality of microphones after the post-filter processing.

20. A tablet terminal comprising:
a memory;
a display surface;
a plurality of microphones, each being arranged on each of peripheral sides of the display surface, wherein each of the plurality of microphones is arranged so as not to be aligned with respect to other microphones arrayed on other sides in a first direction along one side of the display surface and a second direction orthogonal to the first direction;
an orientation detecting sensor configured to detect orientation of the display surface;
a microprocessing unit configured to execute a control program stored in the memory to set an order of arrangement of at least two microphones of the plurality of microphones in a horizontal direction based on a result obtained by the orientation detecting sensor; and
a microphone array controller configured to perform beamforming processing based on sound input from the at least two microphones and corresponding to the order of arrangement of the at least two microphones in the horizontal direction to identify a horizontal sound input direction of a speaking individual.

* * * * *